United States Patent
deOliveira et al.

(10) Patent No.: US 9,785,940 B2
(45) Date of Patent: Oct. 10, 2017

(54) SYSTEM AND METHOD FOR DISTRIBUTED REAL TIME AUTHORIZATION OF PAYMENT TRANSACTIONS

(71) Applicant: Bank of the Ozarks, Little Rock, AR (US)

(72) Inventors: Marcio deOliveira, Sarasota, FL (US); Trevor Burgess, St. Petersburg, FL (US); Nikolai Samteladze, St. Petersburg, FL (US)

(73) Assignee: Bank of the Ozarks, Little Rock, AR (US)

(*) Notice: Subject to any disclaimer, the term of this patent is extended or adjusted under 35 U.S.C. 154(b) by 586 days.

(21) Appl. No.: 14/227,770

(22) Filed: Mar. 27, 2014

(65) Prior Publication Data

US 2015/0278809 A1 Oct. 1, 2015

(51) Int. Cl.
*G06Q 20/40* (2012.01)
*G06Q 20/38* (2012.01)
*G06Q 20/02* (2012.01)

(52) U.S. Cl.
CPC ......... *G06Q 20/385* (2013.01); *G06Q 20/027* (2013.01); *G06Q 20/382* (2013.01); *G06Q 20/401* (2013.01)

(58) Field of Classification Search
CPC .. G06C 20/385; G06C 20/401; G06C 20/027; G06C 20/382
See application file for complete search history.

(56) References Cited

U.S. PATENT DOCUMENTS

| | | | |
|---|---|---|---|
| 6,760,841 B1* | 7/2004 | Fernandez | G06Q 20/04 705/55 |
| 7,103,575 B1* | 9/2006 | Linehan | G06Q 20/12 235/379 |
| 7,287,692 B1* | 10/2007 | Patel | G06Q 20/10 235/379 |
| 8,127,982 B1 | 3/2012 | Casey et al. | |
| 8,423,457 B1 | 4/2013 | Schattauer et al. | |

(Continued)

*Primary Examiner* — Calvin L Hewitt, II
*Assistant Examiner* — Dennis Keritsis
(74) *Attorney, Agent, or Firm* — Shumaker, Loop & Kendrick, LLP; Jeffrey B. Fabian

(57) ABSTRACT

Systems and methods enable the real-time authorization of payment transactions initiated by personal and mobile computing devices. In one embodiment, a financial account server associated with a payment recipient, or payee, is configured to receive a payment data envelope from a payee computing device. The payment data envelope can originate from a payer computing device and include transaction information obtained from an identity management service associated with the payer. The payment data envelope can further include information that allows for the authentication of the payee and payer identities as well as payment instructions. The payee financial account server processes the payment data envelope and transmits the envelope to a financial account server associated with the payer. The payer financial server authenticates the payer identification, authorizes the payment transaction, and transmits a transaction status message to the payee financial server, which in turn transmits the message to the payee computing device.

7 Claims, 6 Drawing Sheets

(56) References Cited

U.S. PATENT DOCUMENTS

| | | | |
|---|---|---|---|
| 8,584,224 B1 * | 11/2013 | Pei | ........................ H04L 9/3213 |
| | | | 713/168 |
| 2007/0244831 A1 * | 10/2007 | Kuo | ........................ G06Q 20/02 |
| | | | 705/67 |
| 2009/0063312 A1 | 3/2009 | Hurst | |
| 2010/0078471 A1 | 4/2010 | Lin et al. | |
| 2010/0082485 A1 | 4/2010 | Lin et al. | |
| 2013/0046643 A1 | 2/2013 | Wall et al. | |
| 2013/0080273 A1 | 3/2013 | Royyuru | |
| 2013/0325718 A1 | 12/2013 | Khan | |
| 2014/0006289 A1 | 1/2014 | Puthenveetil | |
| 2014/0019367 A1 | 1/2014 | Khan et al. | |

* cited by examiner

SYSTEM AND METHOD FOR DISTRIBUTED REAL TIME AUTHORIZATION OF PAYMENT TRANSACTIONS

TECHNICAL FIELD AND BACKGROUND

The present invention relates generally to the field of payment transactions, and more particularly, to systems and methods for distributed, real-time authorization of payment transactions initiated by a mobile device. The systems and methods are capable performing the functions of existing centralized card networks in a unique and efficient manner, and the systems and methods further permit the implementation of the many features and advantages offered by modern computing devices when conducting payment transactions.

Traditional payment transactions between a merchant and a consumer often use credit or debit cards that are processed by a card reader or other point of sale ("POS") device. The POS device reads static, preprogramed information from a magnetic strip on the card and transmits the information to an issuing bank through an acquirer (merchant) bank and a centralized card network (e.g., VISA™ or MASTER-CARD™). The issuing bank approves or declines the transaction and, if approved, transmits a payment to the acquirer bank through the card network. The issuing bank also transmits an approval or decline notice to the POS device that is routed through the card network and the acquirer bank. The card network typically subtracts an interchange fee before routing the payment to the acquirer bank.

Traditional methods of conducting payment transactions have the disadvantage that the information exchanged cannot be customized for each transaction, and the methods are not capable of taking advantage of opportunities provided by recent advances in computing and mobile technology. To illustrate, it is now possible to initiate payment transactions using personal computers or cellular "smartphones" that are capable of transmitting and receiving a variety of useful information during a payment transaction, such as coupon codes, payment instructions, and additional security features for authenticating a consumer's identity (e.g., biometric information or machine gesture recognition).

It would, therefore, be advantageous to provide payment transaction systems and methods that are capable of processing customizable payment transactions initiated and conducted by computing devices. It would also be advantageous to provide distributed payment transaction systems and methods that permit direct communication between financial service providers, such as acquirer and issuing banks, without the need to route payment transactions through a centralized card network that deducts interchange fees.

The systems and methods of the present invention enable the new generation of payment transactions initiated and performed by computing devices and address the requirements needed to bring the such innovations to market by providing a low-cost, highly scalable, and resilient distributed banking and payment platform capable of performing real-time authorization of payment transactions initiated by mobile and other computing devices.

SUMMARY

According to one embodiment of the invention, a method and system of authorizing payment transactions is provided. The method includes receiving, by a first server associated with a payee financial account, a payment data envelope transmitted by a payee computing device. The payment data envelope includes payer data, encrypted payee data, and payment instructions. The payee financial account server decrypts the encrypted payee data, verifies the payee identity by comparing the payee data in the received payment data envelope to payee data stored in a database, and then transmits the payment data envelope to a second financial server associated with the payer. The payee financial server then receives a transaction status message from the payer financial server indicating whether the payment transaction was authorized.

In another aspect of the invention, the payer data includes a payer account alias that is transmitted by the payee financial account server to a routing key and management server. In return, the payee financial account server receives, from the routing key and management server, routing information for transmitting the payment data envelope to the payer financial account server.

According to another embodiment of the invention, a method and system includes receiving, by a first server associated with a payer financial account, a first payment data envelope transmitted by a second server associated with a payee financial account. The payment data envelope includes encrypted payer data, payee data, and payment instructions. The payer financial account server decrypts the encrypted payer data and verifies the payer identity by comparing the payer data in the first payment data envelope to payer data stored in a database. The payer financial account server also determines a whether the payment is authorized or declined. The payer financial server then generates a transaction status message that is transmitted to the payee financial account server.

In one aspect of the invention, the payee data includes a payee account alias that is transmitted by the payer financial account server to a routing key and management server. In return, the payer financial account server receives, from the routing key and management server, routing information for transmitting the transaction status message to the payee financial account server.

Another aspect of the invention provides for the receipt of a second payment data envelope containing payer data transmitted by an identity management server associated with the payer and/or generated by a payer computing device. The payer financial account server verifies the payer identity by: (1) comparing the payer data in the second payment data envelope to payer data stored in a database; and (2) comparing the payer data in the first payment data envelope to the payer data in the second payment data envelope.

In yet another aspect of the invention, the encrypted payer data comprises cancellable biometric information.

In one embodiment of the invention, the payer financial account server authorizes a payment transaction by determining whether data in the payment data envelope complies with one or more payment restrictions associated with the payer and stored in a database on the server. Payment restrictions may include, for instance: a predetermined upper limit on the payment amount; a geographic limitation on the location where the payer can initiate a payment transaction; a limitation on the types of products for which a payer can initiate a payment transaction; and/or a limitation on the identity of the payment recipient for whom the payer can initiate a payment transaction.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

Disclosed herein are systems and methods for distributed, real-time authorization of payment transactions. Although the embodiments described herein are generally described with reference to exemplary commercial transactions where a consumer purchases goods or services from a merchant, those skilled in the art will recognize that the systems and methods are applicable to payment transactions generally. Payment transaction types can include, but are not limited to, sales of goods or services, cancellations, product returns or refunds, credit-based transactions, and promotions.

As used herein, the term "payee" generally describes an individual or entity receiving payment during a transaction, such as a merchant, vendor, retailer, or other seller of goods and services. The term "payer" is intended to generally describe a person or entity that makes a payment during a transaction, such as a purchaser of products or services. The term "payer" may be used interchangeably with the terms "consumer" or "purchaser." Those skilled in the art will recognize that the roles of a payer and payee in any transaction can be reversed as happens when, for example, a customer returns a product to a merchant for a refund.

Figure 1:
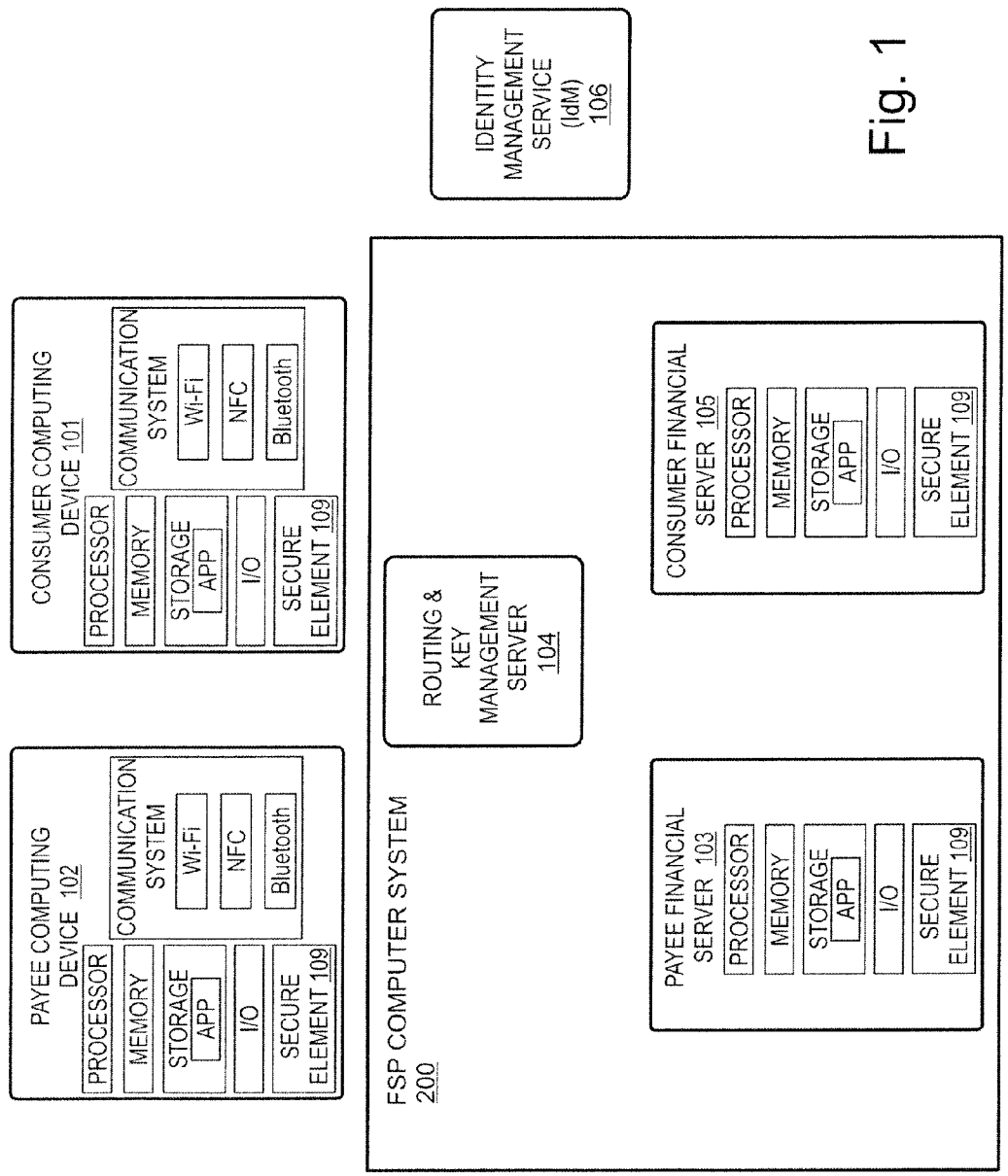
FIG. 1 is a diagram of a distributed, real-time payment transaction authorization system according to one embodiment.

As shown in FIG. 1, a system according to one embodiment of the present invention generally includes a computing device (e.g., an Internet-enabled device) operated by a consumer 101, a computing device associated with a payee 102, an identity management service 106 ("IdM"), and a computer system 200 associated with one or more financial service providers ("FSP"). The FSP computer system 200 may include one or more network computing devices, such as a financial server associated with a payee account 103, a financial server associated with a consumer account 105, and a routing & key management ("RKM") server 104, as well as one or more computing devices associated with FSP employees (not shown). Various components of the FSP computing system 200 can be associated with different FSPs, such as when a merchant and consumer utilize financial accounts with separate FSPs.

The IdM service 106 can include one or more network computing device, such as a server, as well as one or more personal computing devices. Similarly, the payee computing device 102 can be an autonomous device, or it can be networked to a payee computing system (not shown) that includes one or more network computing devices, such as a server, as well as other payee computing devices. A payee computing device can be associated with one or more merchants, such as when an individual person operates two separate businesses and utilizes the same payee computing device to process payment transactions for both businesses. Alternatively, a single merchant may utilize multiple payee computing devices, such as a retailer with numerous sales associates who each utilize a separate payee computing device to process payment transactions.

The system shown in FIG. 1 is not intended to be limiting, and one of ordinary skill in the art will recognize that the systems and methods of the present invention may be implemented using other suitable hardware or software configurations. For example, the FSP computer system 200 may utilize only a single server implemented by one or more computing devices, or a single computing device may implement one or more of the payee account server 103, consumer account server 105, RKM server 104, and/or the FSP employee computing devices. Further, a single computing device may implement more than one step of the method described herein; a single step may be implemented by more than one computing device; or any other logical division of steps may be used.

Any suitable computing device can be used to implement the consumer computing device 101, the payee computing device 102, or the components of the FSP computer system 200. The consumer computing device 101, the payee computing device 102, and the computing devices of the FSP system 200 can include a processor that communicates with a number of peripheral subsystems via a bus subsystem. These peripheral subsystems may include a memory subsystem (e.g., random access memory), a storage subsystem (e.g., optical, mangnetic, or solid-state storage), user input and output subsystems (e.g., a keyboard, mouse, computer monitor, touch-screen display, microphone, or speaker), a networking subsystem, and a communication subsystem. By processing instructions stored on a storage device or in memory, the processors may perform one or more steps of the methods described herein.

In a preferred embodiment, the consumer computing device 101 and the payee computing device 102 are portable electronic devices that include one or more integrated software applications configured to provide, among other features, a user interface configured to facilitate payment transactions and two-way communication with other electronic devices. The consumer computing device 101 and the payee computing device 102 can be any type of suitable portable electronic device, including, for example, a cellular phone, a tablet computer, or a laptop computer. The portable electronic device can also be an application-specific device configured for processing payments, such as a merchant checkout terminal, debit/credit card reader, or virtual wallet.

The software applications integrated with the consumer and payee computing devices 101 & 102 are a program, function, routine, applet, or similar module that performs operations on the computing devices to implement the steps of the methods disclosed herein. For example, the application integrated with the consumer computing device 101 may be one or more of a digital wallet application, a coupon application, a merchant loyalty account application, or any other suitable application configured for processing payment transactions. The application integrated with the payee computing device 102 may be a mobile checkout application, a debit/credit card reader application, or any other suitable point of sale application configured for processing payment transactions. The consumer computing device application and the payee computing device application provide a user interface that outputs data and information to, and accept inputs from, a user. Types of data and information processed by the applications include text, images, audio, video, or any other form of information that can exist in a computer-based environment. The user interface can include various display screens that output data to a user as well as functions for accepting user inputs and commands, such as text boxes, pull-down menus, radio buttons, scroll bars, or other suitable functions known to one of ordinary skill in the art.

The integrated software applications interface with a communication subsystem to provide for a secure connection with other electronic devices. Possible connections include a local area network, a wide area network, an intranet, an Internet connection, a mobile telephone network, a personal area network, or any other suitable connection. The one or more communication subsystems may include a wireless communication system configured to communicate through radio frequency ("RF"), WI-FI (e.g., wireless local area network products based on the Institute of Electrical and Electronics Engineers 802.11 standards), near field communications ("NFC"), Bluetooth, or Low Energy Bluetooth. In one example, a consumer has the ability to make purchases with the consumer computing device 101 by using NFC to wirelessly establish a secure link with the payee computing device 102, which can be connected to (i) a payee computer system configured to facilitate commercial transactions, and (ii) a FSP computer system 200.

A consumer is able to link multiple personal financial accounts to the consumer computing device 101, including checking and savings accounts, credit card accounts, store-specific charge accounts, and electronic funding service accounts (e.g., PAYPAL™). In this manner, a consumer is able to utilize applications integrated with the consumer computing device to purchase goods and services using any of the linked financial accounts. The integrated application can also provide other functions permitting the consumer to receive account balance information, make withdrawals, or deposit funds, among other features.

The consumer computing device 101 and payee computing device 102 include a secure element 109 to ensure confidentiality of sensitive consumer or payee data (e.g., credit card or bank account numbers) during transmission between electronic devices. The secure element 109 exists within a removable smart chip or a secure digital card or is embedded within a fixed chip on the computing device. The secure element 109 includes an integrated software application that performs the functions described herein. The secure element 109 is capable of storing encrypted consumer or payee data 313 & 332 and allowing only trusted applications to access the data. In this manner, the secure element 109 permits software applications to interact with certain functions in the secure element 109 while protecting sensitive data stored in the element 109.

In an exemplary embodiment, the secure element 109 generates an account alias 312 & 331 for sensitive consumer or payee data; though, the account alias 312 & 331 could also be entered by the consumer or provided by a merchant. The alias 312 & 331 is passed to the software applications and transmitted between devices rather than the unencrypted consumer data. The aliases 312 & 331 are identifiers for sensitive consumer or payee data that cannot be used to make a payment without valid crypto data 313 & 332 that corresponds to the aliases 312 & 331. The aliases 312 & 331 do not need to be stored securely because payments made with an alias are not accepted unless the corresponding crypto data 313 & 332 is also supplied.

Figure 2:
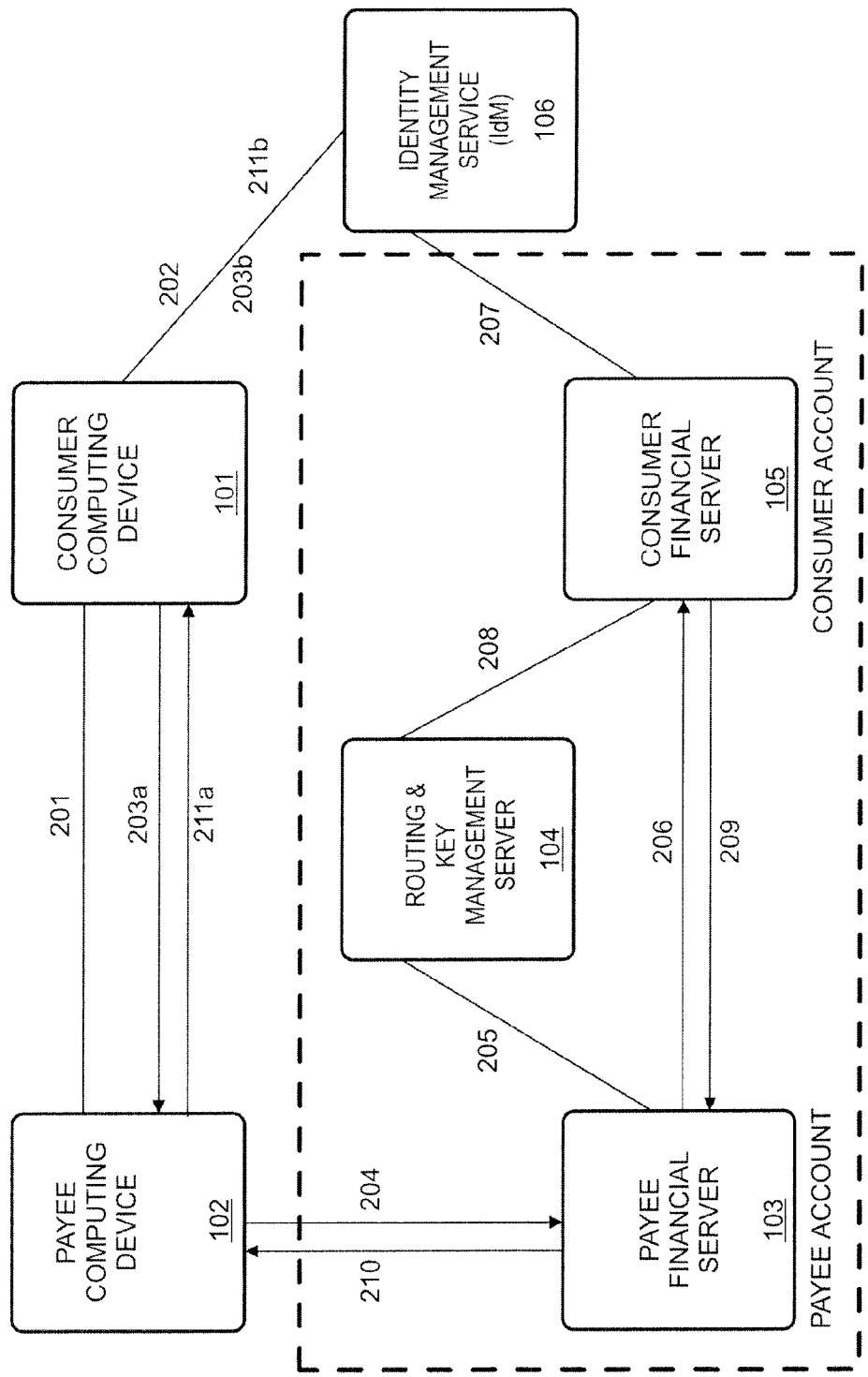
FIG. 2 is a data flow diagram illustrating an exemplary payment transaction authorization system and method according to one embodiment of the invention.

In the embodiment shown in FIG. 2 depicting a purchase made by a consumer, the crypto data 313 is generated using a shared secret 314 that operates on the alias 312 or sensitive consumer data. The shared secret 314 can be, for example, a symmetric key representing a password, a random number, a counter value that is incremented for each alias value, or any other suitable value. The shared secret 314 is distributed to the secure element 109 at the time the device is manufactured as well as loaded into the payee computing device 102 and/or the financial servers 103 & 105 before a payment transaction is initiated. Alternatively, the shared secret 314 is created at the start of a communication session using a key-agreement protocol.

Those of ordinary skill in the art will recognize that the above-described embodiments are not intended to be limiting, and the system and methods described herein can be implemented using other suitable means for establishing a secure connection, such as public/private key encryption, digital signature authentication, or the Wi-Fi Protected Access 2 standard, among others. Further, in embodiments where the payee is making a payment to the consumer, such as during the return of merchandise to a merchant, skilled artisans will recognize that the process is reversed, and the payee generates crypto data 332 using a shared secret 333 that operates on a payee alias 331. The payee shared secret 333 can be the same or different from the consumer shared secret 314. In the case of public/private key encryption, the public key will be transmitted as a shared secret 314 & 333 in the payment envelope 301.

In one or more embodiments, when a consumer initiates a request to make a payment transaction using sensitive consumer data, the financial server determines whether the combination of the alias 312 and crypto data 313 are valid using the shared secret 314 that is known to the secure element 109 and the financial server. The financial server uses the shared secret 314 to verify the alias 312 and the crypto data 313. The financial server receives the alias 312 from the consumer computing device 101 via the payee computing device 102 and combines the alias 312 with other information, as described above. The financial server can then generate the same crypto data 313 using the shared secret 314 and received data and compare the result with the received crypto data 313. If the comparison indicates that the values are the same, then the payment transaction is authorized and proceeds as normal. Otherwise, the transaction can be denied or authorization can be withheld pending the receipt of additional information.

Similarly, if a payee initiates a request to make a payment transaction using sensitive payee data, the financial server determines whether the combination of the payee alias 331 and payee crypto data 332 are valid using the shared secret 333. The financial server receives the alias 331 from the payee computing device 102 via the consumer computing device 101 and combines the payee alias 331 with other information. The financial server can then verify the transaction by generating the same payee crypto data 332 using the payee shared secret 333 and received data and comparing the result with the received payee crypto data 332.

The flow of data during a consumer payment transaction according to one embodiment is illustrated in FIG. 2. During a payment transaction, the consumer computing device 101 connects to the payee computing device 102. At 201, the payee computing device 102 transmits transaction data to the consumer computing device 101 for display to a consumer. Transaction information can include, for instance, a product description, stock-keeping unit ("SKU"), product price, tax payment, merchant identifying information, coupon or discount codes, customer-loyalty information, customer preferences, warranties, product registration information, a transaction identifier, or any other information useful to the consumer.

The consumer computing device 101 displays the transaction information to the consumer and requests payment transaction authorization and payment instructions. In authorizing the payment transaction, the consumer optionally specifies payment instructions. As an example, the consumer can specify a gratuity amount; a discount code; the personal financial account from which the payment should be withdrawn or credited; whether payment should be performed in installments amounts, and if so, the duration and amount of the payments; a merchant rating; or any nonstandard payment instructions capable of being processed by the payee and/or FSP computer system 200.

Before transmitting 203a payment instructions to the payee computing device 102, the consumer computing device 101 can optionally communicate 202 with an IdM service 106 associated with the consumer. The IdM service 106 is an account that permits authentication of the consumer's identity and management of the consumer's preferences or other information. Examples include, but are not limited to, social media accounts, employer accounts, or merchant loyalty accounts. The IdM service 106 provides information to the consumer that is relevant to the payment transaction, such as merchant ratings; cost comparisons; and payment transaction rules, restrictions, or controls. The IdM service 106 can also provide information useful for ensuring the security of the transaction, such as cancellable biometric data, a personal identification number ("PIN"), gesture recognition information, federated identification information, or geographic restrictions on where payment transactions can be authorized.

To illustrate, a consumer may have an IdM service account with his or her employer that utilizes an unique user identification and password and that is associated with an employer-issued credit card for the payment of business expenses. The employer account may include preferences, available discounts, or payment restrictions. Thus, the consumer can be informed of whether the employer has a discount available through a particular merchant or whether the employer limits purchasing authorization to particular merchants, products, geographic locations, or spending limits.

Figure 3:
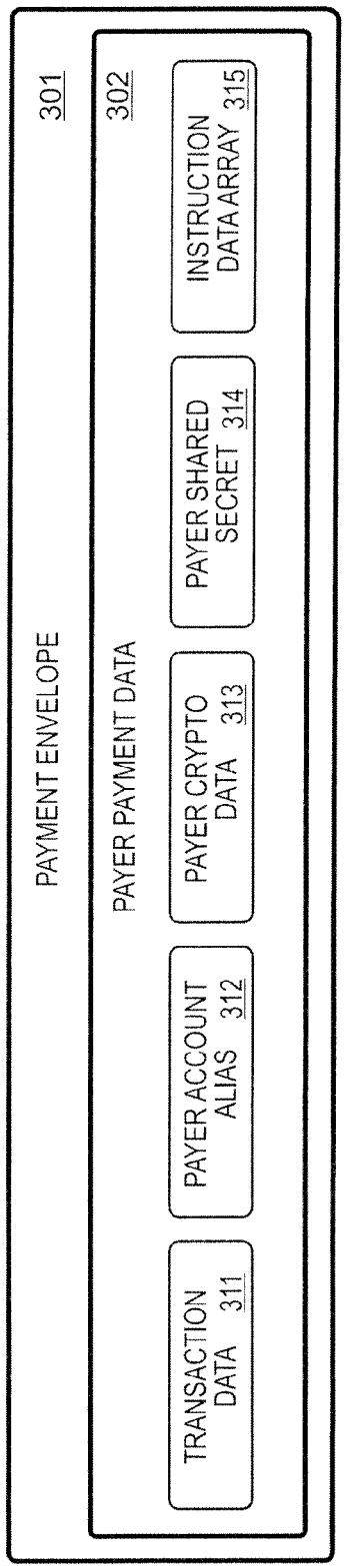
FIG. 3 is an exemplary payment data envelope illustrating payer data.

After receiving authorization and payment instructions from the consumer, a software application integrated with the consumer computing device 101 generates a secure payment envelope 301 that is stored to a database on the consumer computing device 101. The secure payment envelope 301 contains a variety of information to facilitate authentication of the consumer and payee identities, authorization of the payment transaction, and the security of the data transmitted. An exemplary payment envelope 301 generated by the consumer computing device 101 is illustrated in FIG. 3 and includes: (1) transaction data 311; (2) a consumer account alias 312; (3) consumer crypto data 313; (4) a shared secret 314; and (5) a payment instruction data array 315.

Figure 4:
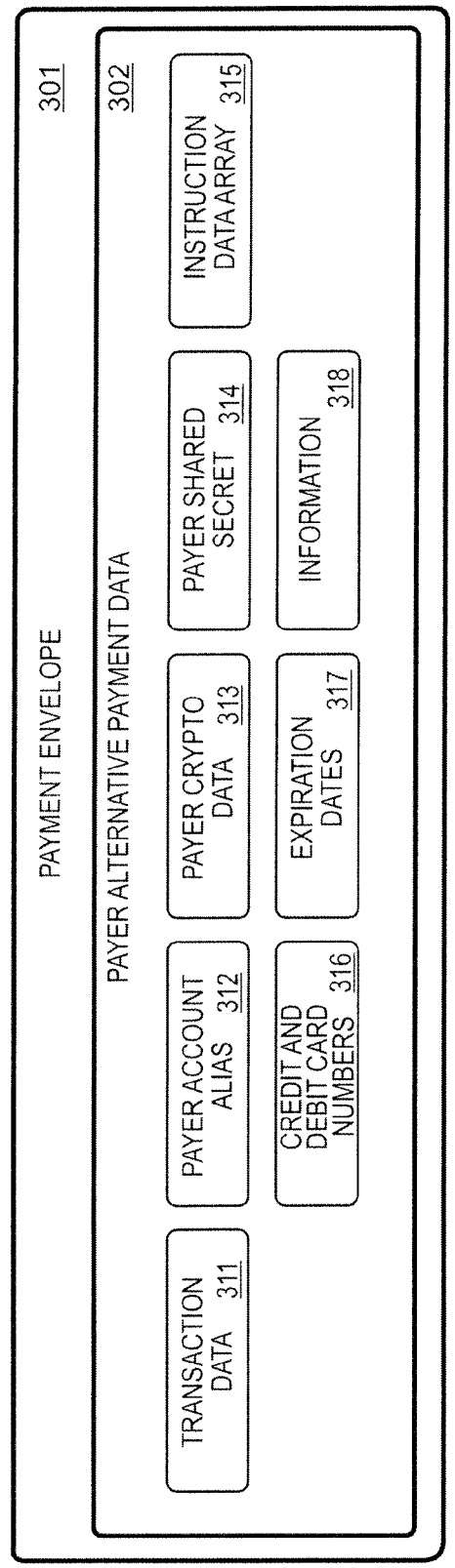
FIG. 4 is an exemplary payment data envelope illustrating payer data.

In the event that the payee computing device 102 or one or more components of the FSP computer system 200 are not configured to process payment transactions using the inventive systems and methods disclosed herein, the secure payment envelope 301 may include additional information to facilitate authorization of the payment transaction through traditional means, as shown in FIG. 4. The additional information includes, for example: (1) credit card or debit card numbers 316; (2) card expiration dates 317; and (3) or other information 318 necessary for authentication, such as a consumer's address, zip code, or card verification value ("CVV").

At 203a & 203b, the consumer computing device 101 transmits the payment envelope 301 and the consumer's payment transaction authorization to the payee computing device 102 as well as to the IdM service 106. The IdM service 106 can in turn transmit 207 the payment envelope 301 to the consumer financial server 105 to update the consumer's account and facilitate authorization of the payment transaction, as described in more detail below. Alternatively, the consumer computing device 101 can bypass the IdM service 106 and transmit the payment envelope 301 directly to the consumer financial server 105.

Figure 5:
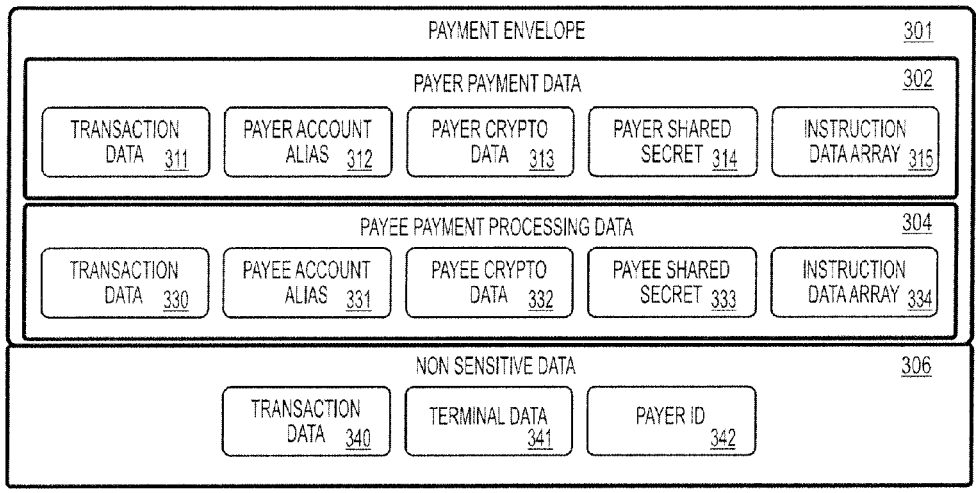
FIG. 5 is an exemplary payment data envelope illustrating payer and payee data.
Figure 6:
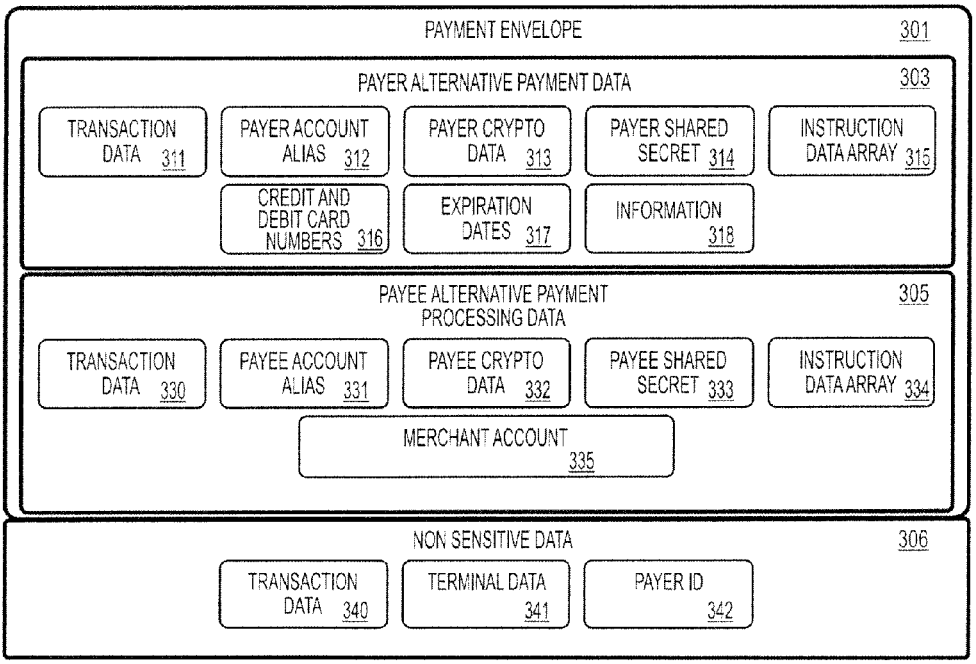
FIG. 6 is an exemplary payment data envelope illustrating payer and payee data.

In processing the payment envelope 301, the payee computing device 102 appends payee data to the envelope, as illustrated in FIG. 5. The appended payee data includes information such as: (1) transaction data 330; (2) a payee account alias 331; (3) payee crypto data 332; (4) a shared secret 333; and (5) an instruction data array 334. In the event that one or more components of the FSP computer system 200 or the consumer computing device 101 are not configured to process payment transactions using the inventive systems and methods described herein, the secure payment envelope 301 may further include information to permit authorization of the payment transaction through conventional means, as shown in FIG. 6. The additional information includes, for example, merchant account information 335 relating to the payee's account with a FSP (e.g., an acquiring bank that contracts with the merchant to create and maintain an account that allows the merchant to accept credit card and debit card payments).

The payee computing device 102 can further append nonsensitive transaction data 306, such as a payer identification 342 or terminal data 341 identifying the payee name, location, and merchant classification. The nonsensitive transaction data 306 could be utilized by the consumer's FSP or IdM service 106 to track the consumer's spending habits. To illustrate, a family can have multiple members utilizing a single checking account where each family member has a separate consumer computing device 101 with an unique payer identification 342. If a parent shares an account with a child, and the child uses a consumer computing device 101 three times in a month and purchases (i) $25 in movie tickets, (ii) $50 of gasoline, and (iii) $25 in fast food, the payer identification 342 and merchant categories 341 (i.e., terminal data) can be appended to the payment envelope 301 as nonsensitive data 306 during each payment transaction. This information is stored to a database on the consumer financial server 105 or IdM service 106 and can be displayed to the parent as a pie chart showing that half of the child's expenditures went to dining and entertainment and half went to transportation.

Turning again to FIG. 2, after processing the payment envelope 301, the payee computing device 102 transmits 204 the payment envelope 301 to the payee financial server 103 for storage and processing. The payee may be associated with one or more financial accounts so that if the primary payee financial account server is unavailable, the payment envelope 301 can be routed to a secondary payee financial account server.

Upon receiving the payment envelope 301, the payee financial server 103 retrieves the payee data from the payment envelope 301, including the payee account alias 331 and the payee crypto data 332. The payee financial server unencrypts the payee crypto data 332 using the shared secret 314/333. The payee identity and transaction are authenticated by, for example, comparing payee and transaction information contained in the received payment envelope 301 with information stored on the payee financial server 103. A payment request record is created and stored to a database on the payee financial server 103.

The payment envelope 301 is routed from the payee financial server 103 to the consumer financial server 105 using information in the consumer account alias 312. As show in in step 205, the payee financial server 103 can optionally obtain from a RKM server 104 additional information useful for communicating with the consumer financial server 105, such as an Internet Protocol ("IP") address for the consumer financial server 105 or a session "token" or "cookie." A token is a packet of data that contains information identifying a series of related message exchanges and that can facilitate routing and authentication of the transmitted messages. As an example, if the account alias 312 is a routing number for a personal financial account, the payee financial server 102 can transmit the routing number to the RKM server 104 and receive in return the IP address of the consumer financial server 105 or a token for establishing a secure communication session. The payee financial server 103 can save the IP address, token, or other routing information to a database for faster processing until the token expires and the communication session with the consumer financial server 105 ends.

After the secure payment envelope 301 is transmitted 206 to the consumer financial server 105, the consumer financial server 105 retrieves the consumer data from the payment envelope 301, including the payee account alias 312 and the consumer crypto data 313. The consumer financial server 105 unencrypts the payee crypto data 313 using the shared secret 314, and a payment request record is created and stored to a database on the consumer financial server 105. The consumer's identity is authenticated and the payment transaction authorized by comparing data from the received payment envelope 301 with consumer or transaction data stored on the consumer financial server 105. If the consumer and transaction data stored on the consumer financial server 105 matches the data contained in the payment envelope 301, then the payment transaction is authorized and proceeds as normal. Otherwise, the payment authorization can be denied or authorization can be withheld pending the receipt of additional information. If the payment transaction is authorized, the consumer financial server 105 will memo post the payment transaction by creating a temporary database record of the payment transaction in the consumer's financial account for which a complete posting to update the consumer account balance will be done as part of an end-of-day batch processing.

In one embodiment, the consumer financial server 105 authenticates the consumer identity and authorizes the payment transaction by retrieving 207 a copy of the payment envelope 301 or other consumer or transaction data stored in a database on the IdM service 106 and comparing this information with the payment envelope 301 received from the payee financial server 103. If the consumer and transaction data stored with the IdM service 106 matches the data contained in the payment envelope 301 received from the payee financial server 103, then the identity of the consumer is authenticated and the payment transaction is authorized. Authentication through the IdM service 106 is optional and can be performed in addition to, or instead of, the authentication and authorization performed by comparing data from the received payment envelope 301 with consumer or transaction data stored in a database on the consumer financial server 105.

The consumer's identity can be authenticated using cancellable biometrics, a preselected personal identification number ("PIN"), machine gesture recognition, or any other secure and independently known consumer data or combination of such data. The payment transaction can be authorized or declined based on a variety of factors, including, for example: (1) whether the consumer identity was properly authenticated; (2) whether the amount of the payment request exceeds the available account balance; and (3) whether the transaction complies with any rules, restrictions, or controls associated with the consumer's account.

Authentication of the consumer identity and authorization of a payment transaction can be better understood with reference to the following simplified example. When establishing a personal checking account or IdM service account, a consumer can provide biometric information, like a fingerprint, as well as conventional security information, like a PIN. Biometric information can be secured by making it "cancellable," which refers to a systematic and repeatable distortion of the biometric information through known techniques, like salting or noninvertible transforms. The consumer can also set one or more rules or restrictions governing the authorization of payment transactions, such as permitting authorization only within the zip code in which the consumer lives. The distorted biometric information is securely stored in a secure element 109 of the consumer computing device 101, the consumer financial server 105, and/or the IdM service 106. The PIN is also stored in a database on the consumer financial server 105 and can optionally be stored on the consumer computing device 101 or IdM service 106 or input by a consumer during a payment transaction.

When authorizing a payment transaction through the consumer computing device 101, the cancellable fingerprint data, PIN, and checking account number are encrypted using the shared secret 314 and stored in the crypto data 313 of the payment envelope 301. The routing number of the checking account is stored in the consumer account alias 312 of the payment envelope 301. The payment envelope 301 is transmitted 203a to the payee computing device 102 and the IdM service 106, and the IdM service 106 transmits the payment envelope 301 to the consumer financial server 105.

The payee computing device 102 appends to the payment envelope 301 nonsensitive data, such as the geolocation of the payee computing device 103. The payee computing device 102 transmits 204 the secure payment envelope 301 to the payee financial server 103, which then transmits 206 the payment envelope 301 to the consumer financial server 105. To properly route the payment envelope 301, the payee financial server 103 transmits 205 the alias 312 (checking account routing number) to the RKM server 104, which returns an IP address for the appropriate consumer financial server 105.

The consumer financial server 105 unencrypts the crypto data 313 using the shared secret 314, and compares the received cancellable biometric data and PIN to the cancellable biometric data and PIN stored on the consumer financial server 105 and associated with the consumer's checking account. The consumer financial server 105 performs an additional security check by comparing the cancellable biometric data and PIN received from the payee financial server 103 to the cancellable biometric data and PIN received from the IdM service 106. The consumer financial server 105 also compares the geolocation data contained in the terminal data 341 of the payment envelope 301 to the geographic zip code restrictions associated with the consumer's account and stored in a database on the consumer financial server 105. The payment transaction is authorized if: (1) the cancellable biometric data and PIN received from the payee financial server 103 matches the corresponding data stored on the consumer financial server 105 and received from the IdM service 106; and (2) the zip code stored in the nonsensitive terminal data 341 of the payment envelope 301 matches the geographic zip code restriction set by the consumer.

After verifying the consumer identity and payment transaction, the consumer financial server 105 generates a transaction status message indicating the status of the payment transaction—i.e., that the payment transaction is authorized, declined, or that authorization is withheld pending the receipt of further information. In 209, the transaction status message is transmitted to the payee financial server 103. The transaction status message can also be transmitted to the IdM service 106 and/or the consumer computing device 101. In 208, the consumer financial server 105 can optionally obtain from the RKM server 104 information useful for communicating with the payee financial server 103, such as an IP address or a session token.

If the payment transaction is authorized, the payee financial server 103 will memo post the payment transaction by creating a temporary database record of the payment transaction in the payee's account. In the event that the payment transaction is not authorized, the payee financial server 103 can route the payment envelope 301 to an alternate consumer financial account server listed in the instruction data array 315. If the alternate consumer financial account also declines the payment transaction, or if no alternate payment accounts are identified, then the transaction is denied or authorization is withheld pending the receipt of additional information. In 210, the payee financial server 103 transmits the transaction status message to the payee computing device 102, which then transmits 211 the transaction status message and possibly a receipt to the consumer computing device 101 for display to the consumer.

Those skilled in the art will recognize that the embodiment illustrated in FIG. 2 is not intended to be limiting, and one or more steps can be omitted or altered, or the order of the steps can be altered, without compromising the functionality of the systems and methods disclosed herein. For instance, if the consumer and payee utilize the same FSP, it might not be necessary for the financial servers to communicate with a RKM server 104 to properly route electronic communications during a payment transaction. Additionally, if the consumer does not have an account with an IdM service 106, or if a payee is making a payment to the consumer, then transmissions 202, 203*b*, 207, and 211*b* involving the IdM service 106 could be omitted. In that case, the consumer computing device 101 could communicate directly with the consumer financial server 105 when transmitting the payment envelope 301 or receiving consumer information and financial account settings and preferences. In other embodiments, the consumer computing device 101 can receive the transaction status message from only the payee computing device 102, from only the IdM service 106, or from both the payee computing device 102 and the IdM service 106.

Figure 7:
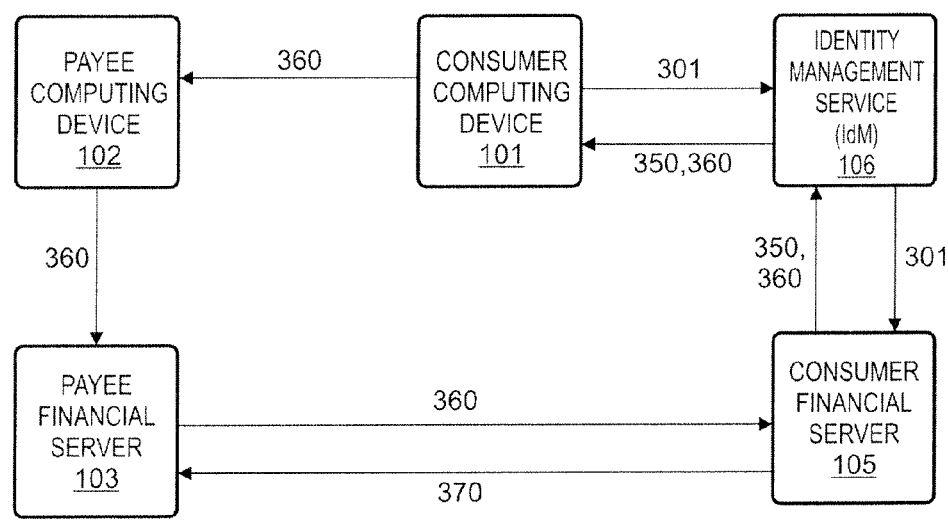
FIG. 7 is a data flow diagram illustrating an exemplary payment transaction authorization system and method according to one embodiment of the invention.

The flexibility of the present systems and methods allows them to accommodate a variety of payment systems and POS devices. To illustrate, if a merchant is capable of processing anonymous payments, the consumer computing device 101 can transmit the payment envelope 301 and payment request to an IdM service 106 and/or directly to the consumer financial server 105, as shown in FIG. 7. The consumer financial server 105 authenticates the consumer's identity and authorizes the payment transaction by comparing the data in the received payment envelope 301 with data stored in a database on the server or with data in a payment envelope 301 received from the IdM service 106. If the transaction is authorized, the consumer financial server 105 transmits a transaction authorization 350 message to the IdM service 106 along with a payment code 360. The payment code 360 can be transmitted to the consumer computing device 101 and then relayed to the payee orally or electronically for redemption with a FSP in exchange for remuneration 370. In this embodiment, the payee does not receive consumer data contained in the payment envelope 301, so the identity of the consumer remains confidential and anonymous.

Figure 8:
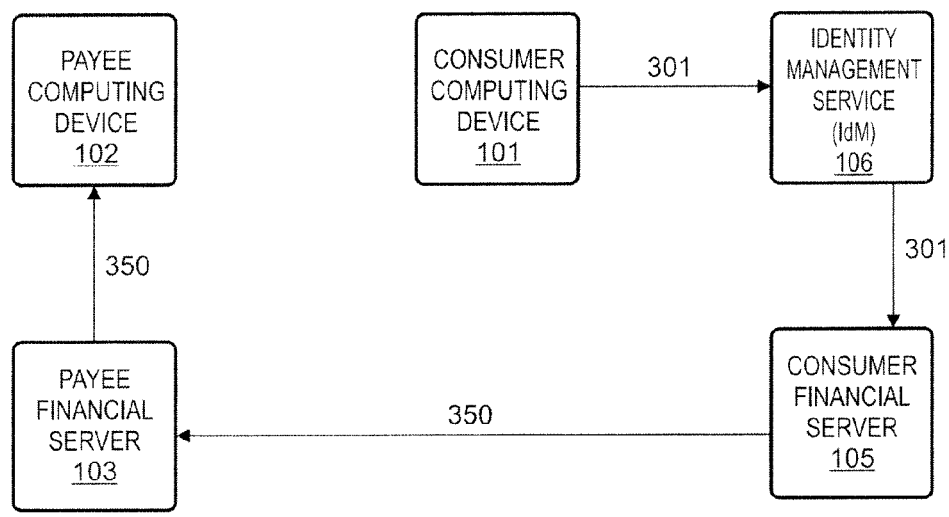
FIG. 8 is a data flow diagram illustrating an exemplary payment transaction authorization system and method according to one embodiment of the invention.

Another exemplary embodiment capable of processing anonymous payments is depicted in FIG. 8. The consumer computing device 101 can transmit a payment envelope 301 and payment approval to an IdM service 106, which transmits the payment envelope to the consumer financial server 105. The consumer financial server 105 authenticates the consumer's identity and authorizes or declines the payment transaction. If the transaction is authorized, the consumer financial server 105 transmits a transaction authorization 350 message to the payee financial server 103, which transmits the transaction authorization message 350 to the payee computing device 102.

Figure 9:
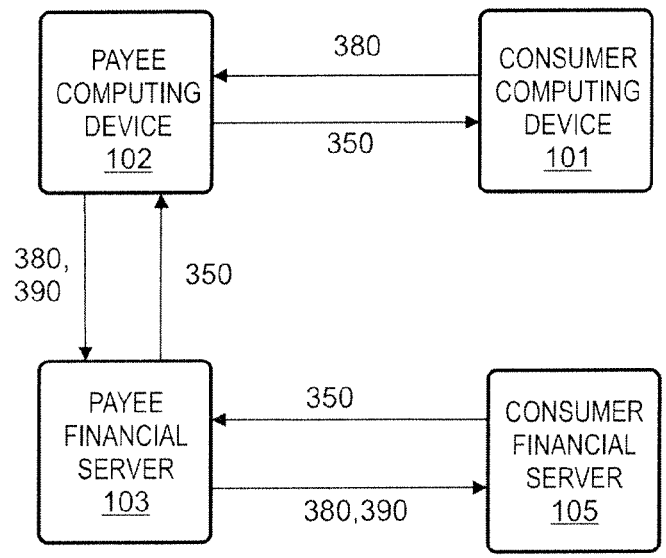
FIG. 9 is a data flow diagram illustrating an exemplary payment transaction authorization system and method according to one embodiment of the invention.

In yet another embodiment illustrated in FIG. 9, the present invention can be used with a secure payment system where the consumer utilizes a merchant-specific charge account or merchant-specific consumer identification and where the merchant securely requests payment authorization from the consumer's FSP without receiving a payment envelope 301 from the consumer. In this embodiment, the consumer computing device 101 transmits to the payee computing device 102 a payee-specific consumer identifier 380 that is recognized by both the payee and the consumer's FSP. The payee's backend system (e.g., the consumer financial server 103) establishes a secure connection with the consumer financial account server 105 and transmits a payment request 390 with the payee-specific consumer identifier 380. If the transaction is authorized, the consumer financial server 105 transmits a transaction authorization message 350 to the payee backend system, which transmits the transaction authorization message to the payee computing device 102, which in turn transmits the authorization message to the consumer computing device 101. This embodiment eliminates any security risk posed by transmitting from the consumer computing device 101 to the payee computing device 102 a payment envelope 301 containing sensitive consumer data.

Figure 10:
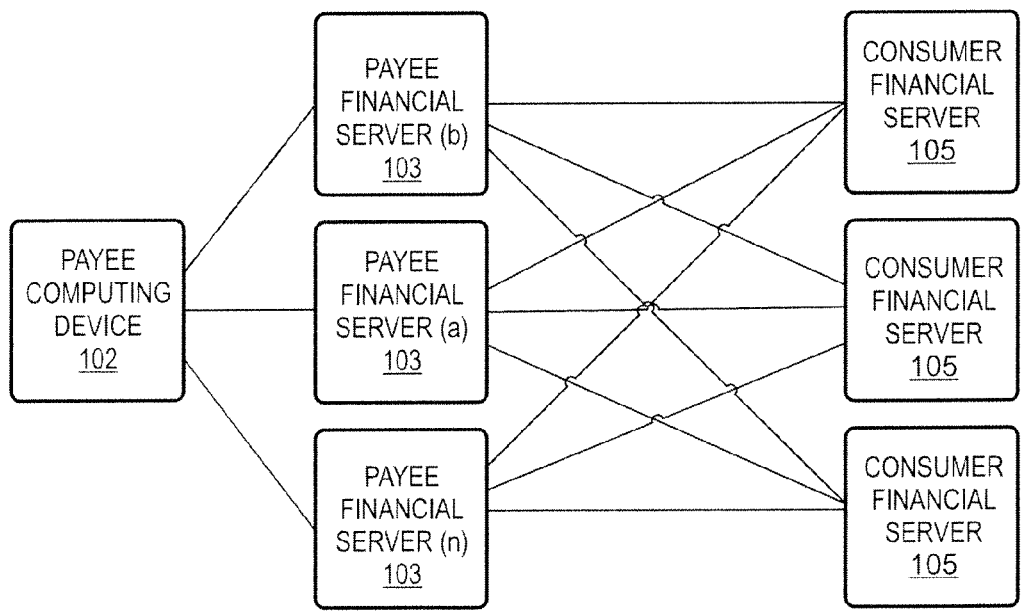
FIG. 10 is a data flow diagram illustrating an exemplary distributed payment authorization system.

Skilled artisans will appreciate that the present systems and methods are capable of accommodating the use of multiple payee financial servers as well as multiple consumer financial servers, as illustrated in FIG. 10. Multiple payee financial servers can be used if, for instance, a single merchant utilizes multiple FSPs; a payee computing device is used for multiple merchants; or a single payee FSP routes payment transactions through multiple financial servers. Multiple consumer financial servers can be used in instances where one payee financial server processes payment transactions for multiple consumers with separate FSPs, or when a single consumer utilizes a number of financial accounts with separate FSPs. FIG. 10 also illustrates the distributed nature of the present systems and methods in that payment transactions are authorized without the need to route the transactions through a centralized card network.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A computer-implemented method of authorizing payment transactions comprising the steps of:
    (a) storing, by a first server, consumer PIN and biometric information and associating, by the server, the consumer PIN and biometric information with consumer payment information;
    (b) receiving by the first server a first payment data envelope associated with a payment transaction, from a payee device, the data envelope comprising an alias of the payee, a consumer shared secret and crypto data including encrypted biometric data, encrypted PIN and encrypted payment information;
    (c) decrypting, by the first server, the encrypted PIN, biometric information and payment information from the first payment data envelope using the consumer shared secret, retrieving, by the first server, the stored consumer PIN and biometric information using the decrypted payment information and comparing, by the first server, the decrypted PIN and biometric information with the retrieved consumer PIN and biometric information;
    (d) authorizing, by the first server, the payment transaction based on the comparison;
    (e) based on the authorizing the payment transaction, generating, by the first server, a transaction status message corresponding to the authorization;
    (f) transmitting, by the first server, the alias of the payee to a RKM server;
    (g) receiving, by the first server, an IP address from the RKM server; and
    (h) transmitting, by the first server, the transaction status message to a second server using the IP address.

2. The method of claim 1, wherein the method further comprises:
    (a) receiving by the first server, a second payment data envelope comprising payer data transmitted by an identity management server associated with the payer;
    (b) verifying the payer identity in the first server by comparing the payer data in the second payment data envelope to payer data stored in a database of the first server; and
    (c) verifying the payer identity in the first server by comparing the payer data in the first payment data envelope to the payer data in the second payment data envelope.

3. The method of claim 1, wherein the method further comprises:
    (a) storing by the first server, payer data to a database of the first server;
    (b) generating by the payer computing device, a second payment data envelop comprising payer data;
    (c) transmitting by the payer computing device, the second payment data envelop to the first server; and
    (d) verifying the payer identity in the first server by comparing the payer data in the second payment data envelope to the payer data in the database of the first server; and
    (e) verifying the payer identity in the first server by comparing payer data in the first payment data envelope to the payer data in the second payment data envelope.

4. The method of claim 1, wherein determining whether the payment transaction is authorized comprises:
    (a) storing by the first server, one or more payment restrictions to a database;
    (b) associating by the first server, the payment restrictions with the payer; and
    (c) determining by the first server, whether data in the first payment data envelop or a second payment data envelope complies with the one or more payment restrictions.

5. The method of claim 4, wherein the payment restrictions comprise a predetermined upper limit on the payment amount.

6. The method of claim 4, wherein the one or more payment restrictions comprise a geographic limitation on the location of the payment transaction.

7. The method of claim 4, wherein the one or more payment restrictions comprise a limitation on the types of products subject to a payment transaction.

* * * * *